United States Patent [19]

Manzoni

[11] 4,150,585
[45] Apr. 24, 1979

[54] CONTROL DEVICE FOR A REARVIEW MIRROR

[75] Inventor: Stéphane N. Manzoni, Saint-Claude, France

[73] Assignee: Societe Manzoni-Bouchot, Saint-Claude, France

[21] Appl. No.: 764,309

[22] Filed: Jan. 31, 1977

[30] Foreign Application Priority Data

Feb. 12, 1976 [FR] France ............................ 76 03880
Apr. 23, 1976 [FR] France ............................ 76 12150
Jul. 30, 1976 [FR] France ............................ 76 23427

[51] Int. Cl.² ........................................... F16C 1/10
[52] U.S. Cl. ............................ 74/501 M; 74/471 XY
[58] Field of Search ............ 74/501 M, 471 XY, 120, 74/553

[56] References Cited

U.S. PATENT DOCUMENTS

| 213,270 | 3/1879 | Wiegand | 301/5 B |
|---|---|---|---|
| 504,330 | 9/1893 | Coldwell | 74/96 |
| 2,917,972 | 12/1959 | Bonaguro | 74/86 |
| 3,370,480 | 2/1968 | Gionet | 74/501 M |
| 4,041,793 | 4/1977 | Repay | 74/501 M |

*Primary Examiner*—Samuel Scott
*Assistant Examiner*—Gery Anderson

[57] ABSTRACT

A control device for a rearview mirror comprises a mirror fixed on a support element mounted for pivoting about a first axis on a crossbar which is mounted on a yoke rigid with a casing for pivoting about a second axis perpendicular to the first axis. Two independent cams are mounted on the casing to act respectively on a boss imparting to the mirror a pivoting movement about the first axis, and on a boss imparting to the mirror a pivoting movement about the second axis.

18 Claims, 16 Drawing Figures

CONTROL DEVICE FOR A REARVIEW MIRROR

The present invention relates to control devices for rearview mirrors.

A rearview mirror control device for a vehicle is known in which the mirror is fixed on a support element mounted for pivoting about a first axis on a cross-bar which is mounted on a casing for pivoting about a second axis perpendicular to the first axis. The support element and crossbar are respectively provided with a threaded hole engaged by a threaded rod connected to a flexible element.

However, a control device of this type does not make it possible for very accurate adjustment of the mirror to be achieved or for the latter to be held in a clearly determined position when subjected to vibrations.

In order to obviate this disadvantage, use is made in the present invention, of cams which effect the displacement of the support element and cross-bar in order to permit adjustment of the mirror on two axes at right angles to one another.

According to the present invention, there is provided a control device for a rearview mirror comprising a mirror fixed on a support element mounted for pivoting about a first axis on a crossbar which is mounted on a yoke rigid with a casing for pivoting about a second axis perpendicular to the said first axis; and two independent cams mounted on the casing to act respectively on a boss imparting to the mirror a pivoting movement about the first axis, and on a boss imparting to the mirror a pivoting movement about the second axis.

An arrangement of this kind makes is possible for the two cams to be brought together on a single movable or immovable support, in order to simplify assembly and operation while obtaining a sufficiently thin casing.

Furthermore, the utilisation of two independent cams makes it possible for the movement of the mirror about the two axes to be increased if necessary, and for different amplitudes of inclination to be obtained when required.

The cams may act directly on the mirror and may be operated manually from outside the casing in the event of the accidental fracture of, for example, flexible elements or control cables leading to the interior of the vehicle.

In the preferred embodiment, the mirror cannot be put out of adjustment by accidental external action, which is an advantage over known control devices.

In one embodiment, if the mirror should be accidentally pushed, the support provided by the mirror, stop, and cam is positive in one direction. In the other direction of support, a return spring is compressed and returns the mirror to its starting position when the support is relaxed.

The invention is illustrated, merely by way of example, in the accompanying drawings, in which:

FIGS. 1 to 4 illustrate a control device according to the present invention for a rearview mirror comprising a casing 1 mounted in known manner on a body of a vehicle by means of a retractable arm (not shown).

A mirror 2 is mounted in the casing 1 so as to be directable about two axes X, $X_1$, and Y,$Y_1$ perpendicular to one another, and is fixed by a support element 3 having two lugs 4, 4a by which the support element is mounted for pivotal movement about axis X, $X_1$ which is horizontal, by means of a pin 5, on a crossbar 6 which in turn is mounted for pivotal movement about the axis Y, $Y_1$ which is vertical by means of a rod 7. One end of the rod 7 is screwed into a threaded hole 8 of a boss rigidly fixed to the casing 1, the other end 7a of the rod being engaged in the crossbar 6 and in two branches 9, 9a of a yoke, between which branches the crossbar 6 is mounted for pivotal movement. The branches 9, 9a are rigidly mounted on the bottom of the casing 1 as shown in the drawing, but could also be rigidly mounted on a plate mounted, by means of a ball joint, on the bottom of the casing 1, in order to permit preadjustment of the entire control device.

In the bottom of the casing 1 are disposed two circular bell-type cams 27, 27a which are mounted for rotation on pins 28, 28a fixed in a hole 29 provided in the bottom of the casing 1. On their periphery the cams 27, 27a have profiled annular walls 30, 30a against which bear studs 31, 31a rigidly connected to the support element 3 of the mirror 2, under the action of a spring 24.

One of the studs 31, which is offset in relation to the axis X, $X_1$ is disposed in a plane perpendicular to the mirror 2 and passing through one of the pivoting axes Y, $Y_1$ of the mirror while the other stud 31a is offset laterally in relation to the axes X, $X_1$ and Y, $Y_1$. Each cam 27, 27a has a cylindrical portion 32, 32a on which is wound a control cable 33, 33a which is connected at one of its ends to a respective coil spring 34, 34a which is connected by one of its ends to a finger 35, 35a rigidly fixed to the bottom of the casing 1. The cables 34, 34a are disposed for sliding movement with sheaths 36, 36a. The sheaths 36, 36a each bears against a respective directable stop element 37, 37a of a known type.

At its bottom part, the casing 1 has two cutouts 38, 38a in which are engaged the annular edges 30, 30a of the cams 27, 27a which are flush with or project slightly beyond the wall of the casing, these cams being accessible from outside the casing for manual operation in the event of rupture of the cables 33, 33a.

The control device functions in the following manner.

For the purpose of pivoting the mirror 2 about the axis X, $X_1$ the cable 33 is operated against the action of the spring 34 in such a manner as to turn the cam 27 about its axis 28 and to act by its edge 30 on the stud 31 situated on the axis Y, $Y_1$ in such a manner as to bring about pivoting of the mirror 2 about the rod 5.

For the purpose of pivoting the mirror 2 about the axis Y, $Y_1$ the cable 33a is operated against the action of the spring 34a in such a manner as to cause the cam 27a to turn about its pin 28a and to act by its edge 30a on the pin 31a which is offset in relation to the axis Y, $Y_1$ in such a manner as to bring about pivoting of the mirror about the rod 7.

In the case of the control device illustrated in FIGS. 1 to 4 the cams 27, 27a are respectively rigid with a pin which is adapted to be driven rotationally by a small motor-reduction gearing unit disposed in the casing. The motor-reduction gearing unit is controlled by an electric circuit comprising a source of electric current and switches.

Figure 1:
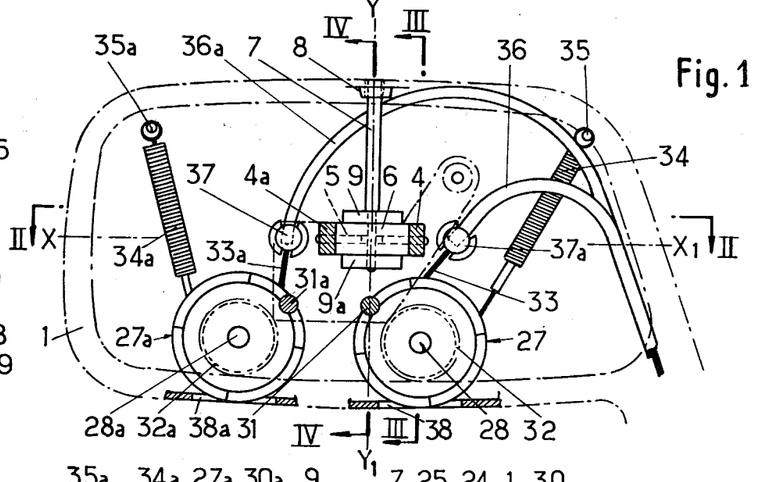
FIG. 1 is a view in elevation of one form of control device according to the present invention for a rearview mirror.
Figure 2:
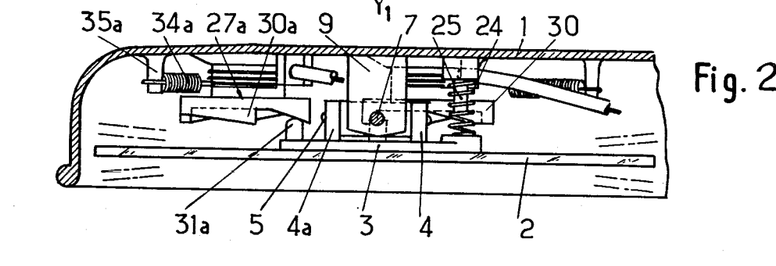
FIG. 2 is a section on the line II—II in FIG. 1.
Figures 3, 4:
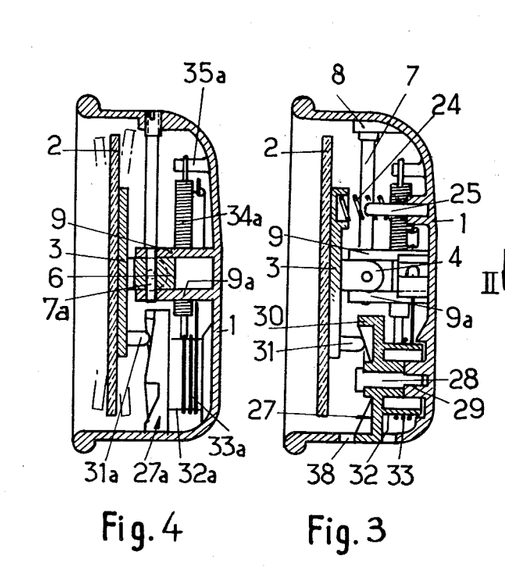
FIG. 3 is a section on the line III—III in FIG. 1.
FIG. 4 is a section on the line IV—IV in FIG. 1.
Figure 5:
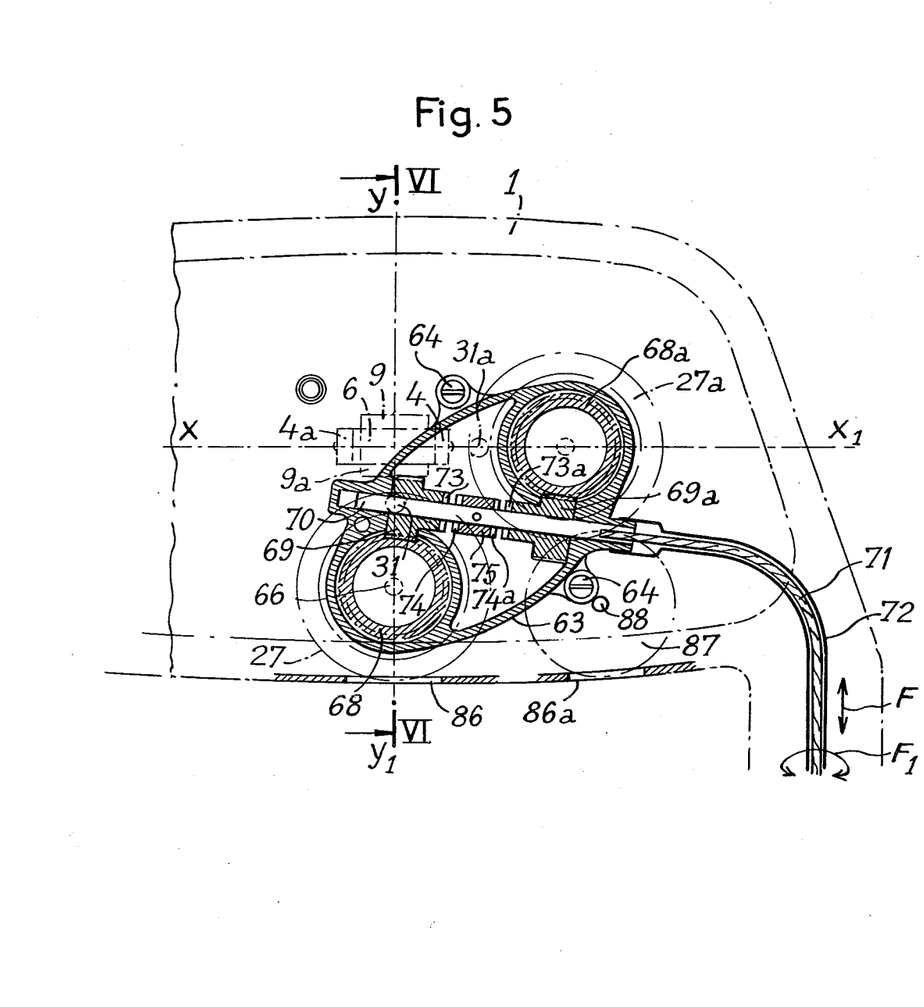
FIG. 5 is a front view in elevation of another control device according to the present invention for a rearview mirror.
Figure 6:
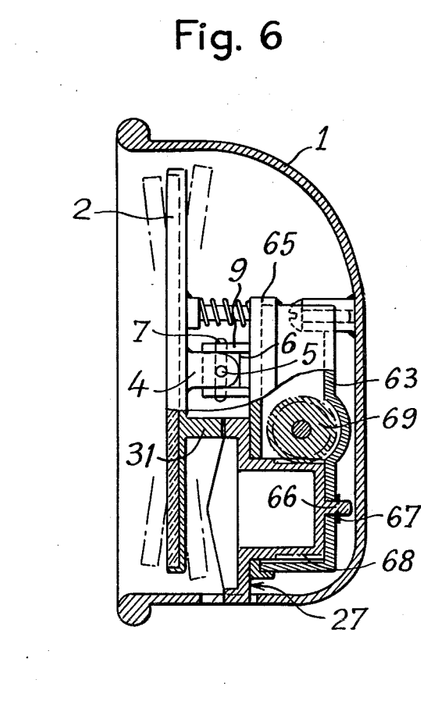
FIG. 6 is a partial cross-sectional view on the line VI—VI in FIG. 5.

In FIGS. 5 and 6 is shown a form of construction of the control device in which the method of articulation of the mirror 2 on the bottom of the casing is identical to the embodiment illustrated in FIGS. 1 to 4 except that one of the studs 31, 31a is situated on the axis X, $X_1$ and the other on the axis Y, $Y_1$. The control device comprises a housing 63 which is fixed on the bottom of the casing 1 by means of screws 64 and which is closed by a cover 65. The cams 27, 27a mounted for rotation on the housing 63, are identical to those previously described and have a pin 66 engaged in a hole in the casing and retained by a spring washer 67.

Each of the cams 27, 27a has a cylindrical portion which is machined to form a helical toothed wheel 68, 68a having teeth inclined at 45° and meshing with a helical toothed wheel 69, 69a cut to the same inclination of 45° and mounted for free rotation on a pin 70 connected to a flexible cable 71 disposed in a flexible sheath 72, the pin 70 being adapted to slide axially in the direction of an arrow F and to turn in the direction of the arrow $F_1$. The toothed wheels 69, 69a are provided on their faces opposite one another with teeth 73, 73a adapted to mesh selectively with corresponding teeth 74, 74a provided on a drive element 75 disposed between the toothed wheel 69, 69a and rigidly fixed to the pin 70.

For the purpose of pivoting the mirror 2 about the axis X, $X_1$ the cable 71 and the rod 70 are caused to slide axially in order to bring the teeth 74 of the driving element 65 into mesh with the teeth 73 of the toothed wheel 69, thus coupling the toothed wheel 69 to the cable 71. The cable 71 is then rotated in the direction of the arrow $F_1$ in order to drive rotationally, by way of the toothed wheels 69, 68 the cam 27 which acts on the stud 31 and so effect pivoting of the mirror 2 about the axis X, $X_1$.

In order to pivot the mirror 2 on the axis Y, $Y_1$, the cable 71 and the rod 70 are caused to slide axially in order to bring the teeth 74a of the drive element 75 into engagement with the teeth 73a of the toothed wheel 69a, thus coupling the toothed wheel 69a to the cable 71. The cable 71 is then rotated in the direction of the arrow $F_1$ in order to drive rotationally, by way of the toothed wheels 69a, 68a, the cam 27a which acts on the stud 31a and so effect pivoting of the mirror 2 about the axis Y, $Y_1$.

In the event of damage to the adjusting cable 71, the cams 27, 27a can be operated manually. For this purpose openings 86, 86a are provided in the casing 1, as in the previous embodiment, in order to have direct access to the periphery of the cam 27 which extends into the aperture 86.

The cam 27a is controlled with the aid of an intermediate wheel 87 extending into the aperture 86, this wheel 87 and the cam 27a being provided on their peripheries with gear teeth enabling the cam 27a to be driven by the wheel 87. This wheel 87 is mounted on a shaft 88 fixed on the casing 1 by a lug (not shown).

Figure 7:
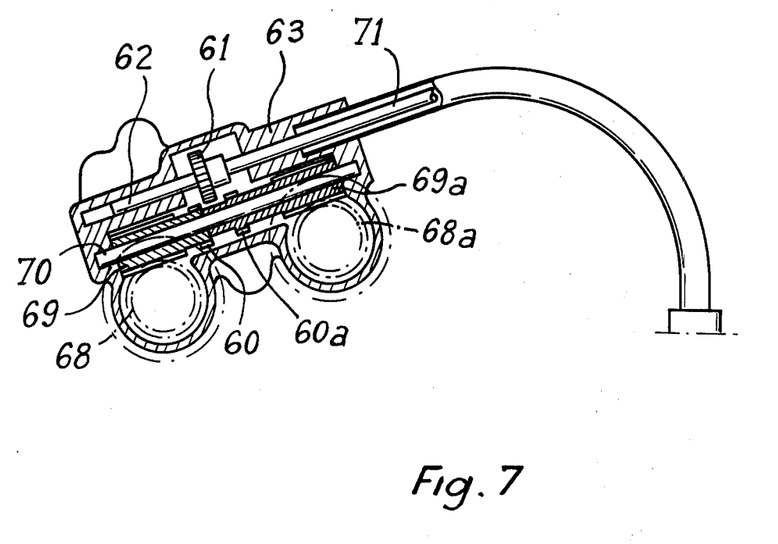
FIG. 7 is a front view in elevation of a modification of the control device shown in FIG. 5.

FIG. 7 illustrates a modification of the embodiment shown in FIGS. 5 and 6, wherein 69, 69a are single-thread or multi-thread worms each of which carries at one end a pinion 60, 60a integral with it. The worms 69, 69a are free to turn on the pin 70 secured to the housing 63.

On the secondary pin 62 which is connected to the cable 71 is keyed a pinion 61 adapted to slide axially with the pin 62 in order to mesh selectively with the pinions 60, 60a and to drive one or the other of the tangent wheels 68, 68a.

Figure 8:
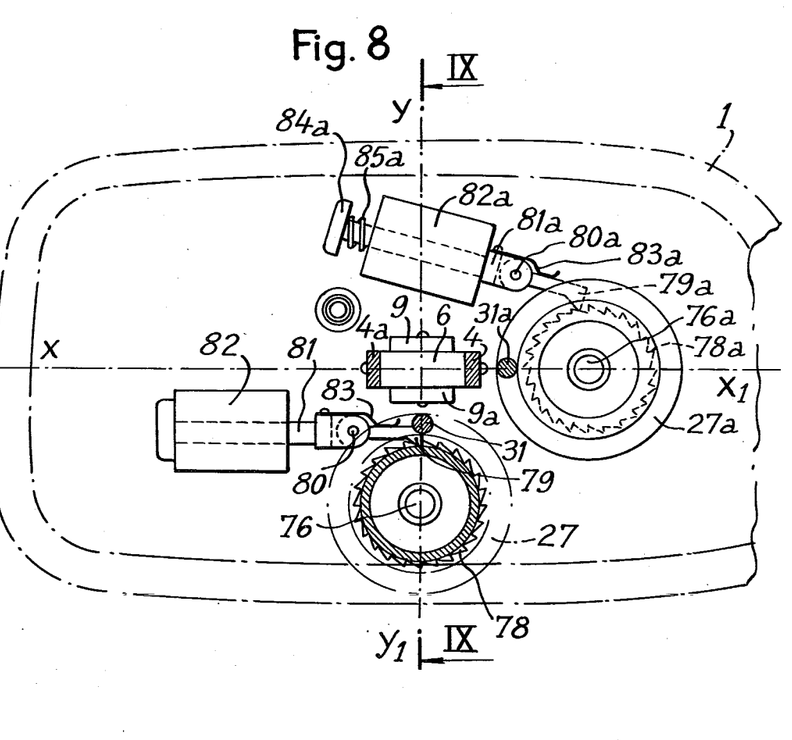
FIG. 8 is a front view in elevation of another form of control device according to the present invention for a rearview mirror.
Figure 9:
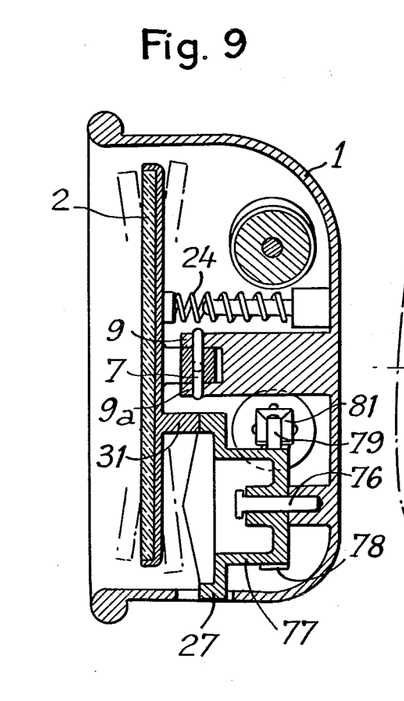
FIG. 9 is a cross-sectional view on the line IX—IX in FIG. 8.

In FIGS. 8 and 9 is shown another form of control device according to the present invention, which, as previously comprises a means for articulating the mirror 2 on the axes X, $X_1$ and Y, $Y_1$.

The cams 27, 27a are mounted for free rotation on shafts 76, 76a fixed to the bottom of the casing 1, and they have a cylindrical portion 77 provided with teeth 78, 78a forming a ratchet wheel cooperating with a pawl 79, 79a articulated about a pin 80, 80a at the end of a plunger core 81, 81a of an electromagnet 82, 82a.

The pawl 79, 79a is acted on by a leaf spring 83, 83a, which hold the pawl 79, 79a in engagement with the teeth 78, 78a.

At its end the plunger core 81, which performs a reciprocating movement has a boss 84, 84a against which bears a return spring 85, 85a.

In order to effect pivoting of the mirror 2 about the axis X, $X_1$ the electromagnet 82 is fed with electric current so as to impart to the core 81 and to the pawl 79 a reciprocating movement such that each stroke of the pawl advances the teeth 78 by one tooth space and drives the cam 27 rotationally. Since through the action of the spring 24 the cam 27 is in contact with the stud 31 disposed along the axis Y, $Y_1$ the mirror 2 is moved on the axis X, $X_1$.

In order to effect pivoting of the mirror 1 about the axis Y, $Y_1$ the electromagnet 82a is fed with electric current so as to impart a reciprocating movement to the core 81a and to the pawl 79a so that each stroke of the pawl 79a effects advances of the teeth 78a by one tooth space and thus rotationally drives the cam 27a. Since through the action of the spring 24 the cam 27a is in contact with the stud 31a disposed along the axis X, $X_1$ a movement of the mirror 2 on the axis Y, $Y_1$ is brought about.

Figure 10:
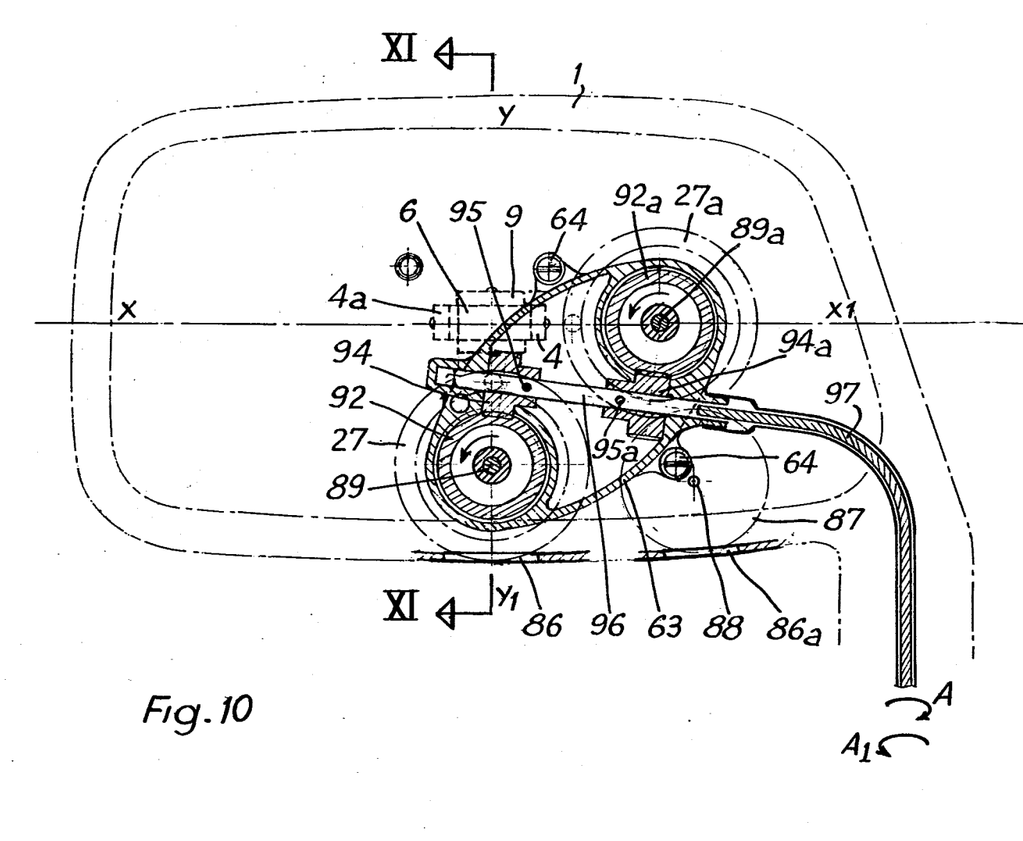
FIG. 10 is a sectional view on the line X—X in FIG. 11.
Figure 11:
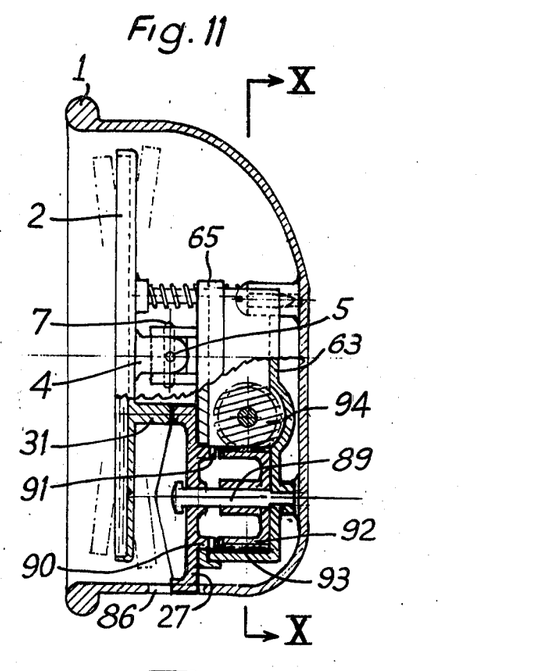
FIG. 11 is a section on the line XI—XI in FIG. 10.

In FIGS. 10 and 11 is shown a control device according to the present invention in which the method of articulation of the mirror 2 on the bottom of the casing 1 is effected about the axes X, $X_1$ and Y, $Y_1$ and the cams 27, 27a are mounted for free rotation by pins 89, 89a fixed on the bottom of a housing 63 which is fixed on the bottom of the casing 1 by means of screws 64 and which is closed by a cover 65.

Figures 12, 13:
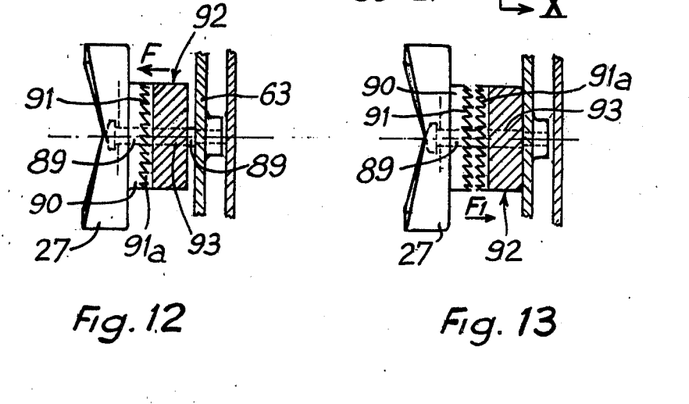
FIG. 12 is a detail view showing a cam and its control wheel of the control device of FIG. 5 in the engaged position.
FIG. 13 is a similar view to FIG. 12 showing the cam and its control wheel in the disengaged position.

Each of the cams 27, 27a is rigidly fixed to a cylindrical part 90 which has teeth 91 (FIGS. 11, 12, 13) adapted to engage with corresponding teeth 91a of a wheel 92, 92a mounted for free rotation on the pin 89, 89a of the cam 27, 27a and adapted to be moved axially in the directions of the arrows F and F$_1$.

On the periphery, the wheels 92, 92a have helicoidal teeth 93 inclined at 45° in the same direction and meshing with corresponding helicoidal teeth on two pinions 94, 94a fixed symmetrically by pins 95, 95a on a drive shaft 96 driven rotationally in one direction or the other, as shown by the arrows A and A$_1$, either by a flexible cable 97 disposed in a sheath or by a motor-reduction gearing unit (not shown).

The arrangement operates in the following manner.

When the cable 97 is turned in one direction or the other, as indicated by the arrows A or A$_1$ the pinions 94, 94a drive the wheels 92, 92a rotationally, but because of the teeth inclined at an angle of 45° one of the pinions tends to push back one of the wheels 92a against the housing 63 and the other pinion tends to push back the wheel in the direction of the arrow F, thus bringing the teeth 91, 91a into mesh (FIG. 12) and coupling the cam 27 to the wheel 92, which is able to rotate the cam 27 in order to act on the mirror 2 for the purpose of inclining the latter about the axis X, X$_1$. In order to incline the mirror about the axis Y, Y$_1$ the cable 97 is turned in the other direction, thus uncoupling the teeth 91, 91a and consequently uncoupling the cam 27 and the wheel 92, which moves in the direction of the arrow F$_1$. At the same time the wheel 92a moves in the direction of the arrow F, so that the teeth 91, 91a come into mesh and the wheel 92a can rotationally drive the cam 27a which acts on the mirror 2 so as to pivot the latter about the axis Y, Y$_1$.

As described previously, the cam 27 can be operated directly through the aperture 86 provided in the casing, while the cam 27a can be operated with the aid of the wheel 87 through the aperture 86a.

Figure 14:
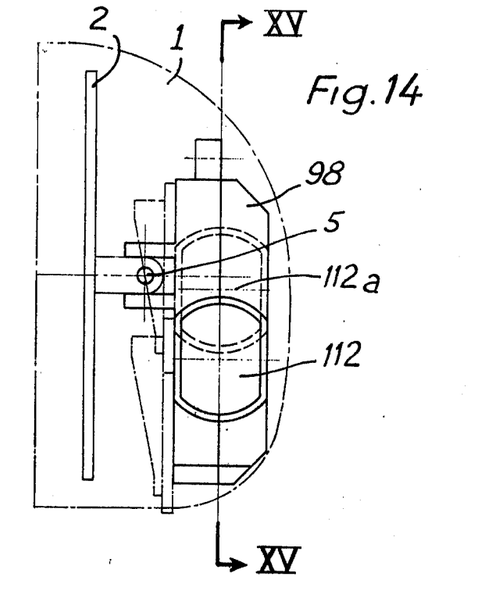
FIG. 14 is a view of another form of control device according to the present invention for a rearview mirror.
Figure 15:
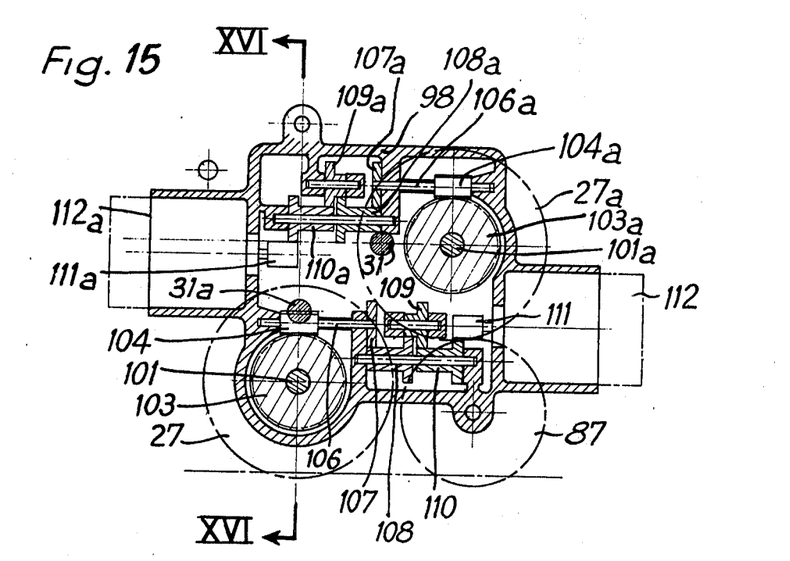
FIG. 15 is a section on the line XV—XV in FIG. 14.
Figure 16:
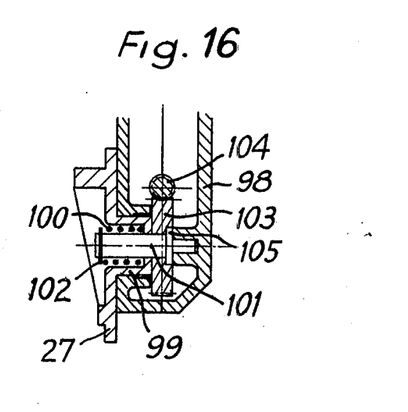
FIG. 16 is a section on the line XVI—XVI in FIG. 15.

In FIGS. 14, 15, and 16 is shown another form of control device according to the present invention for a mirror 2, in which a housing 98 is fixed by means of screws on the casing 1. In the housing 98 the cams 27, 27a are mounted for rotation, each of them having a hub 99 mounted for rotation in a corresponding cylindrical recess in the housing 98, the hub 99 being frictionally engaged to tangent wheels 103, 103a by means of a helical compression spring 100 (FIG. 16) mounted under compression on a pin 101, 101a and bearing against a washer 102 and the bottom of the hub 99.

The pin 101, 101a which is mounted for rotation by one of its ends in a bore in the housing 98 and which bears by a shoulder 105 against the latter, is rigid with the tangent wheel 103, 103a meshing with a worm 104, 104a.

The worm 104, 104a is keyed on a shaft 106, 106a mounted for rotation in the housing 98 and carrying at one of its ends a pinion 107 107a meshing with a series of pinions 108, 109, 110, and 108a, 109a, 110a; the pinion 110, 110a meshes with a pinion 111 mounted on the end of the shaft of an electric motor 112, 112a.

By selectively feeding the motors 112, 112a the cams 27, 27a are driven rotationally by the two series of reduction pinions, and the position of the mirror 2 is thus adjusted about its two axes. As in the previous embodiments, the cams 27, 27a can be operated directly through openings 86, 86a this being achieved with the aid of the wheel 87 in the case of the cam 27a.

What is claimed is:

1. In a control device for a rearview mirror, said device comprising a support element, a mirror mounted on said support element, a casing, means connecting said support element to said casing, said connecting means including means for mounting said support element for pivoting about a first axis of rotation, means for mounting said support element for pivoting about a second axis of rotation, said first and second axes being oriented perpendicular to each other, the improvement comprising:
   (a) first and second rotatable cam members, said first and second cam members defining respective first and second circular camming surfaces extending completely around the respective axes of rotation of said cam members;
   (b) first and second means for rotatably mounting said first and second cam members respectively, on said casing, said rotatable mounting means supporting said cam members adjacent to said support element;
   (c) means on said support element defining first and second cam follower surfaces for respectively engaging said circular camming surfaces, said first cam follower surface being disposed in a plane perpendicular to said mirror and extending through said first axis, said second follower surface being disposed in a plane offset from said first axis;
   (d) means for rotating said first cam member to cause said support element to pivot about said first axis, and
   (e) means for rotating second cam member to cause said support element to pivot about said second axis.

2. A control device as claimed in claim 1 in which each cam has a cylindrical portion on which is wound a control cable connected at one of its ends to a resilient element and extending inside a sheath in which it is mounted for sliding movement.

3. A control device as claimed in claim 1 in which the casing has two apertures so that an edge region of the cams is flush with or extends slightly beyond the casing to be manually rotatable from the outside.

4. A control device as claimed in claim 1 in which a resilient element extends between either the casing or a plate fixed to the casing and the support element, the resilient element consisting of a coil spring inside which is disposed a stop rod fixed on the casing.

5. A control device as claimed in claim 1 in which a deformable seal is mounted between an edge of the mirror and an edge of the casing.

6. A control device as claimed in claim 1 in which the pivoting elements and the cams are mounted on means having a hemispherical portion which is mounted directably on a corresponding hemispherical portion of the casing.

7. A control device as claimed in claim 1 in which each cam is mounted on a shaft arranged to be rotated by a motor-reduction gearing unit.

8. A control device as claimed in claim 1 in which each cam has a cylindrical portion provided with teeth co-operating with a pawl, which is biassed by a resilient element and which is mounted for pivotal movement at the end of an electromagnet plunger the arrangement being such that movement of the plunger causes the cam to be indexed by one tooth space.

9. A control device as claimed in claim 1 in which each cam member comprises a cylindrical portion on which is provided a helical toothed wheel whose teeth are inclined at 45° and which meshes with a respective helical tooth wheel having teeth cut to the same inclination of 45° and mounted on said support element, said toothed wheels being mounted for free rotation on a common shaft with, on their opposing faces, teeth which selectively mesh with corresponding teeth provided on corresponding faces of a drive element fixed to said common shaft which is connected to a control cable whereby said common shaft can be displaced axially and rotationally.

10. A control device as claimed in claim 9 in which said casing has two openings in which are respectively positioned the edge of said second cam member and the edge of a toothed wheel meshing with a toothed portion of said first cam member, said second cam member and said toothed wheel being accessible from outside the casing for manual operation.

11. A control device as claimed in claim 9 in which worms having one or more threads and mounted for free rotation on a secondary shaft rigid with the housing are respectively fixed with two toothed pinions cooperating with a toothed pinion keyed on the shaft and adapted to be moved axially and rotationally through the action of the control cable.

12. A control device as claimed in claim 1 in which each cam is fixed to a cylindrical portion which has teeth adapted to mesh with corresponding teeth of a wheel mounted for free rotation on a cam shaft and adapted to be displaced axially, the said wheel having helical teeth meshing with corresponding helical teeth of a pinion mounted for rotation with a control shaft.

13. A control device as claimed in claim 12 in which the helical teeth of the wheel and the pinion are inclined at 45°.

14. A control device as claimed in claim 12 in which the pinions meshing with the wheel are disposed symmetrically on the control shaft and their teeth are inclined in the same direction.

15. A control device as claimed in claim 12 in which the control shaft is connected by a flexible element to a manual control button.

16. A control device as claimed in claim 12 in which the control shaft is rigid with an output shaft of a motor rotating in two directions.

17. A control device as claimed in claim 1 in which each cam is fixed to a tangent wheel which meshes with a worm mounted for rotation in bearings provided on a plate fixed to the casing, each worm being connected by a kinematic reduction gearing transmission to a drive shaft of a motor fixed in a recess in the said plate.

18. A control device as claimed in claim 17 in which each cam is connected to a shaft of the respective tangent wheel by a clutch device consisting of a spring bearing on one side against the cam and on the other side against a washer rigid with the shaft of the tangent wheel.

* * * * *